United States Patent
Bormioli

(10) Patent No.: US 7,357,426 B2
(45) Date of Patent: Apr. 15, 2008

(54) QUICK-COUPLING AND QUICK-RELEASE SAFETY CONNECTOR FOR PIPING

(76) Inventor: Gorenzo Bormioli, Via Carlo Cerato, 14, Padova (IT) 35100

( * ) Notice: Subject to any disclaimer, the term of this patent is extended or adjusted under 35 U.S.C. 154(b) by 328 days.

(21) Appl. No.: 10/530,356

(22) PCT Filed: Oct. 15, 2003

(86) PCT No.: PCT/EP03/11425

§ 371 (c)(1),
(2), (4) Date: Apr. 6, 2005

(87) PCT Pub. No.: WO2004/036105

PCT Pub. Date: Apr. 29, 2004

(65) Prior Publication Data

US 2006/0001262 A1  Jan. 5, 2006

(30) Foreign Application Priority Data

Oct. 16, 2002 (IT) .......................... MI2002A2196

(51) Int. Cl.
*F16L 37/18* (2006.01)
(52) U.S. Cl. .................. 285/314; 285/18; 285/920; 285/315; 137/614.05
(58) Field of Classification Search ................ 285/920, 285/314, 29, 18; 137/614.06, 614.05
See application file for complete search history.

(56) References Cited

U.S. PATENT DOCUMENTS

| 2,788,243 | A | * | 4/1957 | Goodliffe et al. ........... 285/314 |
| 5,507,313 | A | | 4/1996 | LeDevehat |
| 5,752,724 | A | * | 5/1998 | Bormioli ..................... 285/18 |

FOREIGN PATENT DOCUMENTS

| EP | 0153773 | 9/1985 |
| EP | 0541142 | 5/1993 |
| FR | 1237982 | 8/1959 |
| GB | 854763 | 11/1960 |

\* cited by examiner

*Primary Examiner*—Aaron Dunwoody
(74) *Attorney, Agent, or Firm*—Jacobson Holman PLLC

(57) ABSTRACT

A connector for piping including two tubular fitting parts and quick-coupling and quick release connector having a plurality of locking segments circumferentially distributed in a plane perpendicular to the axis of the fitting parts and housed in radial slots of an axial projecting portion of a first fitting part that, during the coupling stage, is superimposable to a corresponding projecting axial portion of the second fitting part. A revolving ring can be controlled to rotate in order to work on the locking segments so as to push them into at least one radial seat of the projecting portion of the second part of a joint or to house them in its own radial seat, respectively for the coupling and the uncoupling of the fitting parts. Two independently operable hydraulic cylinders are arranged substantially at 180° from each other in the rotation plane of the revolving ring and they react, each one, between a first lever fastened to the first fitting part and a second lever fastened to the revolving ring. The first lever is made up of a radially more external part and of a radially more internal part that are connected with each other by an articulation which is modifiable in order to be able to assume a first operating condition for the complete mutual locking of the two parts of the first lever and a second operating condition of consent to the rotation of the radially more external part of the first lever in a direction of approach to the second lever.

3 Claims, 4 Drawing Sheets

QUICK-COUPLING AND QUICK-RELEASE SAFETY CONNECTOR FOR PIPING

This is a nationalization of PCT/EP03/011425 filed Oct. 15, 2003 and published in English.

FIELD OF THE INVENTION

The present invention concerns a quick-coupling and quick-release safety connector for piping.

BACKGROUND OF THE INVENTION

There are many occasions in which it is demanded to provide the quick coupling of two pipes, as also their equally quick separation. This is the case, for example, of piping used for the transfer of fluid oil products in difficult environment conditions, sometimes dangerous, as in open sea or from sea to earth and vice-versa.

To this purpose there are currently known quick-coupling and quick-release connector devices, that are capable to couple and to uncouple to each other two pipes in a safe and quick way.

One of these is described in EP-A-0153773 and comprises two tubular fitting parts that are fastenable to respective pipes to be joined and quick-coupling and quick release means for said fitting parts. The quick coupling and quick release means comprise a plurality of locking segments that are circumferentially distributed in a plane perpendicular to the axis of said fitting parts and housed in a radially movable way in respective radial slots of a projecting axial portion of a first fitting part that, during the coupling step, is superimposable to a corresponding projecting axial portion of the second fitting part. A revolving ring can be controlled to rotate around the projecting portion of the first fitting part in order to work on said locking segments so as to bias them into radial housings of said projecting portion of the second fitting part or to house them in their radial housings, respectively for the coupling and the uncoupling of said fitting parts. A hydraulic cylinder reacting between said first fitting part and said revolving ring usually provides to the movement of the revolving ring.

This is an extremely safe and quick connector, that assures the coupling and the separation of the two pipes in an optimal way.

The only possible inconvenience can consist in a difficulty in uncoupling theoretically determinable by the missed working of the cylinder for the movement of the revolving ring, for instance because of a formation of ice after a long period of permanence of the connector in open sea or as a result of transfer of oil products at very low temperature. In such case, in fact, the ring does not rotate and the connector does not open in order to release the two pipes.

SUMMARY OF THE INVENTION

Scope of the present invention is now to provide a quick-coupling and quick-release connector of the aforesaid type, that is capable to guarantee the maximum safety in uncoupling, when required.

According to the invention such scope is attained by using two hydraulic cylinders (or equivalent means) for the movement of the revolving ring which are arranged substantially at 180° to each other in the rotation plane of the ring and reacting, each one, between a first lever fastened to one of the two fitting parts and a second lever fastened to the revolving ring, and by dividing said first lever into a radially more external part and a radially more internal part connected with each other by an articulation which is modifiable in order to be able to assume two different operating conditions, one for the complete mutual locking of the two parts of the first lever and the other one for the consent of the rotation of the radially more external part of the first lever in the direction of approach to the second lever.

The presence of two cylinders (or other equivalent movement means) instead of one makes possible their use one as a substitute for the other one, so that in case of jamming of one of the two cylinders the control of the other one to carry out the uncoupling operation of the connector is possible in any case. On the other hand the modifiable articulation interposed between the two parts of each first lever prevents, when in consent condition, the cylinder from opposing to the rotation of the ring and at the same time, when in locking condition, it forces the non controlled cylinder to carry out the same movement of the controlled cylinder to go back to the coupling position.

If desired it is also possible to increase the safety of the connector by making the connection of the two cylinders possible not only to a normal hydraulic control system but also to manual hydraulic pumps that are capable to intervene when necessary.

BRIEF DESCRIPTION OF THE DRAWINGS

The characteristics of the present invention will be made evident from the following detailed description of an embodiment thereof that is illustrated as a non limiting example in the enclosed drawings, in which.

DETAILED DESCRIPTION OF THE PREFERRED EMBODIMENTS

Figure 1:
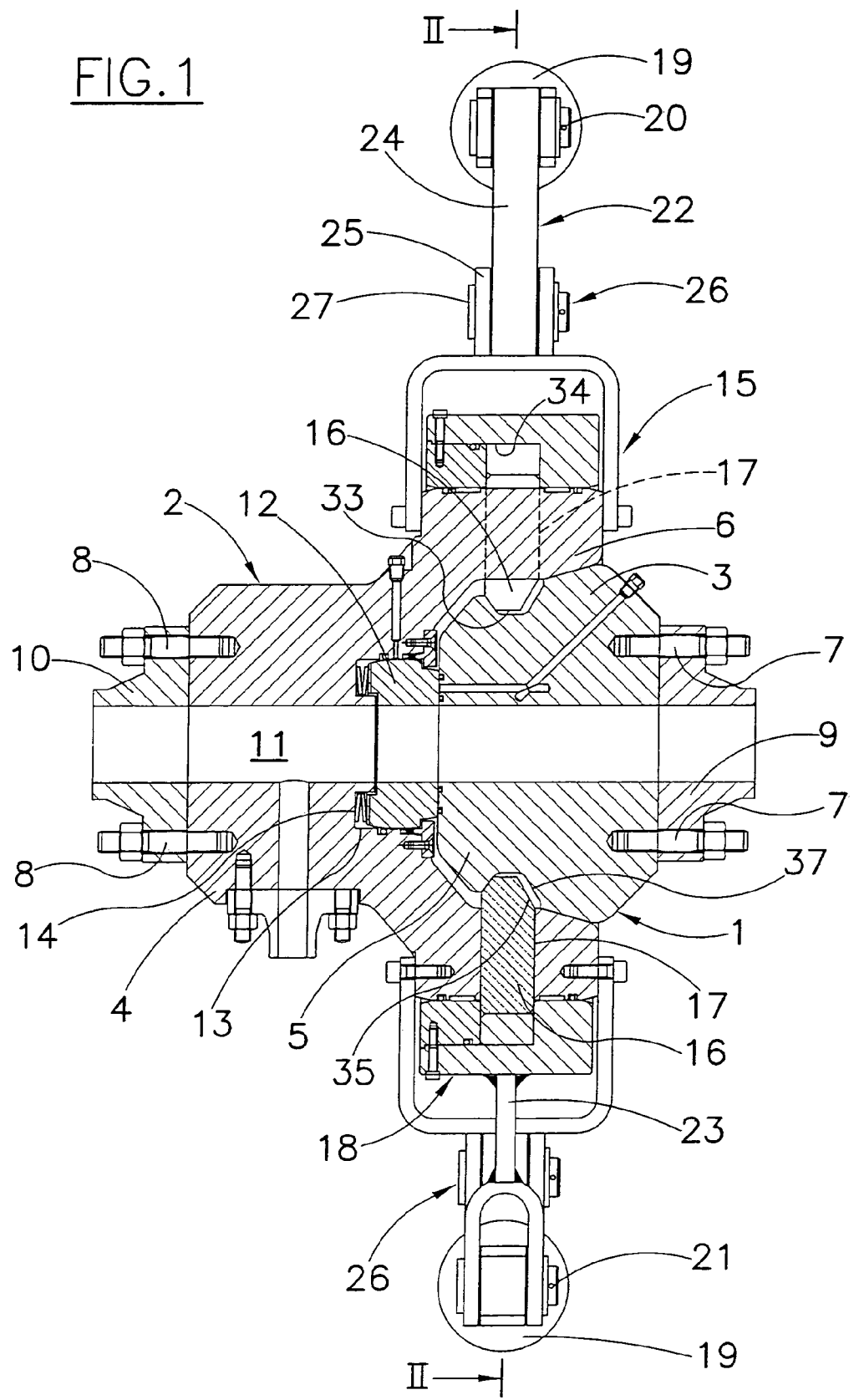
FIG. 1 shows a connector according to the invention in coupling condition, as sectioned along its axis according to the line I-I of FIG. 2.

The connector shown in the drawings comprises (FIG. 1) a first tubular fitting part 1 and a second tubular fitting part 2, each one made up of a respective body portion 3, 4 and of a respective projecting axial portion 5, 6. The body portions 3, 4 are destined to the fastening, by means of screws 7, 8, to respective pipings 9, 10 to be coupled. The projecting portions 5, 6 are in turn insertable one into the other one in order to define a single cylindrical passage 11 for the flow of fluid from one piping to the other one. An axially mobile ring 12 is housed in an axial front housing 13 of the projecting portion 6 of the fitting part 2 and is thrust by a spring 14 toward the facing projecting portion 5 of the fitting part 1.

The mutual connection of the two fitting parts 1 and 2, and therefore of two pipes 9 and 10, is provided by quick-coupling and quick release means 15 which include (FIG. 2) a plurality of locking segments 16 circumferentially distributed in a plane perpendicular to the axis of the passage 11 and housed in radially movable way in respective radial slots 17 of the projecting portion 6 of the fitting part 2.

Around the circumferential sequence of locking segments 16, on the fitting part 2 a revolving ring 18 is arranged that can be controlled to rotate by one or by the other one of the two independent by operable hydraulic cylinders 19, that are located in diametrically opposite positions in the rotation plane of the ring 18 and normally in contracted position. Each one of the two cylinders 19 has its two ends respectively hinged in 20 and 21 in a first lever 22 integral with the projecting portion 6 of the second fitting part 2 and in a second lever 23 integral with the revolving ring 18. The first lever 22 is subdivided into two parts 24 and 25, the first one radially more external and the second one radially more internal, that are connected with each other by a modifiable articulation 26 made up of a hingement pin 27 and by a removable gudgeon 28 that is insertable in lined up holes 29 and 30 of the two parts of lever 24 and 25. The presence of the gudgeon 28 determines the mutual locking of the aforesaid parts of lever, whereas the absence of gudgeon 28 allows the first part 24 of the lever 22 to rotate in the sense of approach to the second lever 23 (counter-clockwise sense in FIG. 2). A shoulder 39 of the second part 25 of the lever 22 prevents instead the first part 24 of the same lever 22 to rotate in clockwise sense as regards the second part 25. The two cylinders 19 are provided with mouths 31 and 32 that are normally connected with a common hydraulic control system and also connectable with manual emergency pumps.

Figure 2:
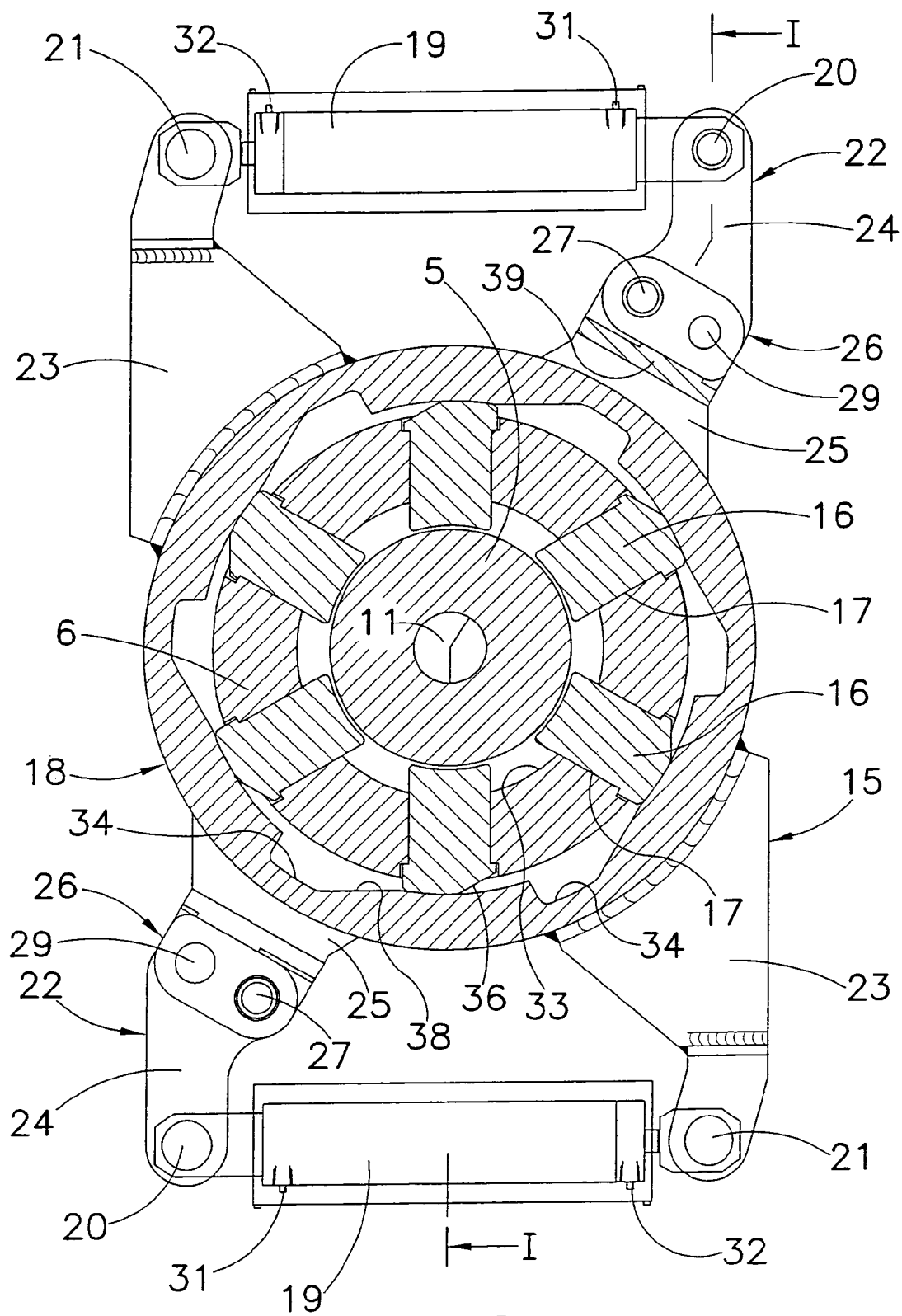
FIG. 2 shows the same connector in transversal section according to the line II-II of FIG. 1.
Figure 3:
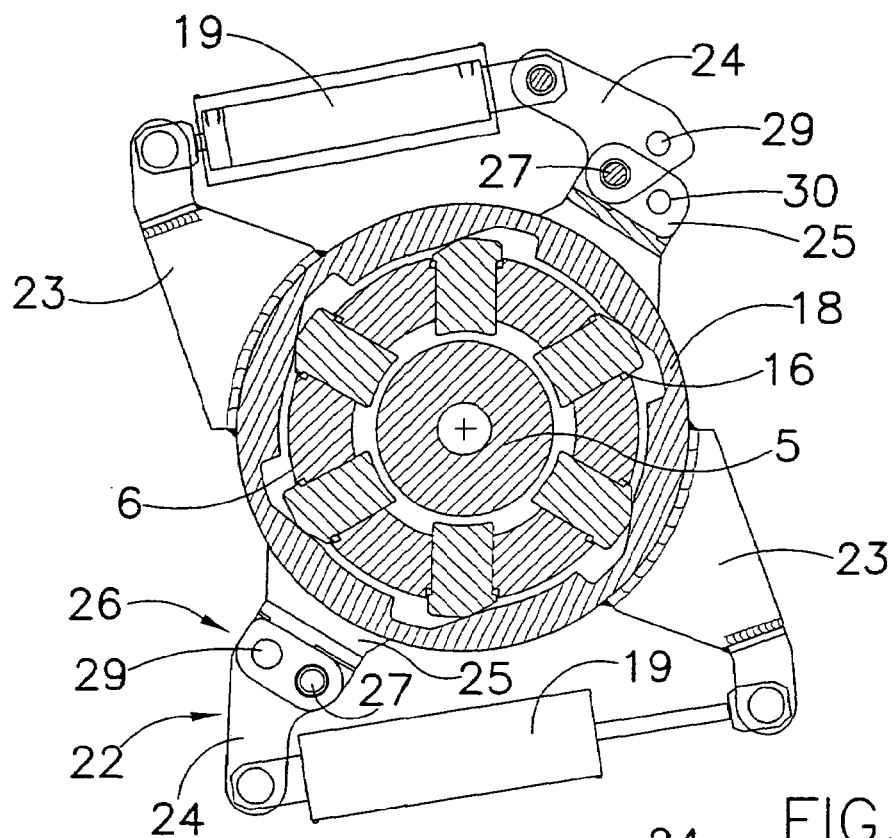
FIG. 3 shows the connector sectioned as in FIG. 1 in the course of an uncoupling movement.
Figure 4:
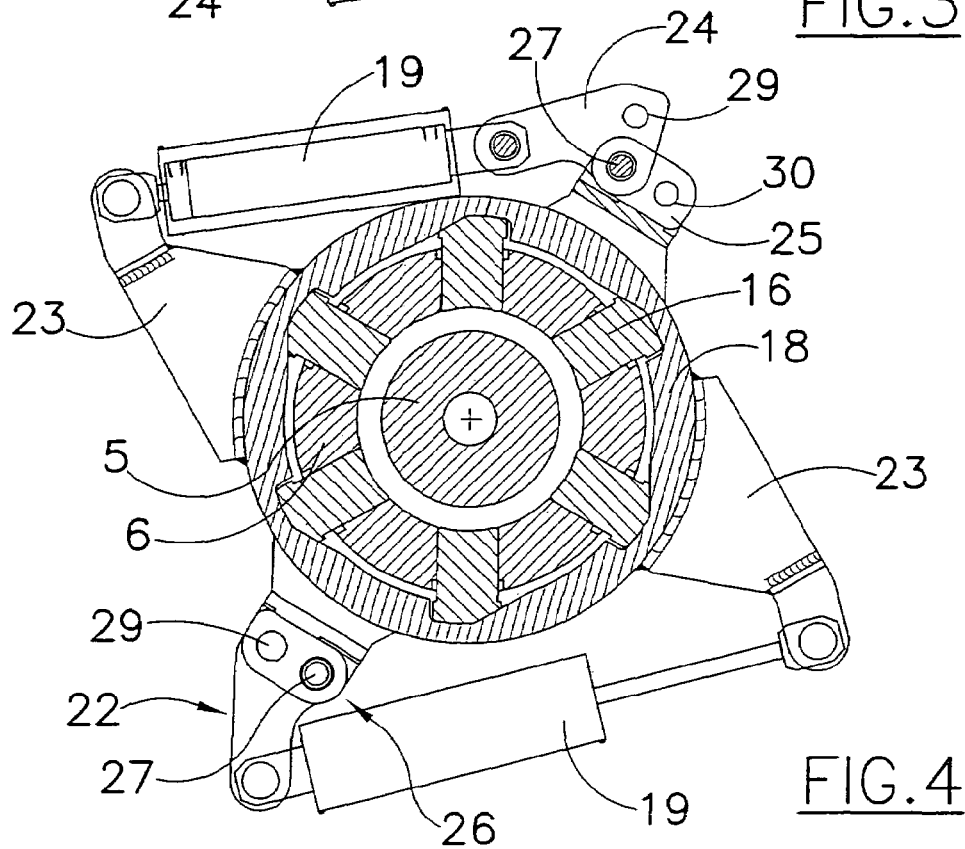
FIG. 4 shows the connector sectioned as in FIG. 1 at the end of an uncoupling movement.
Figure 5:
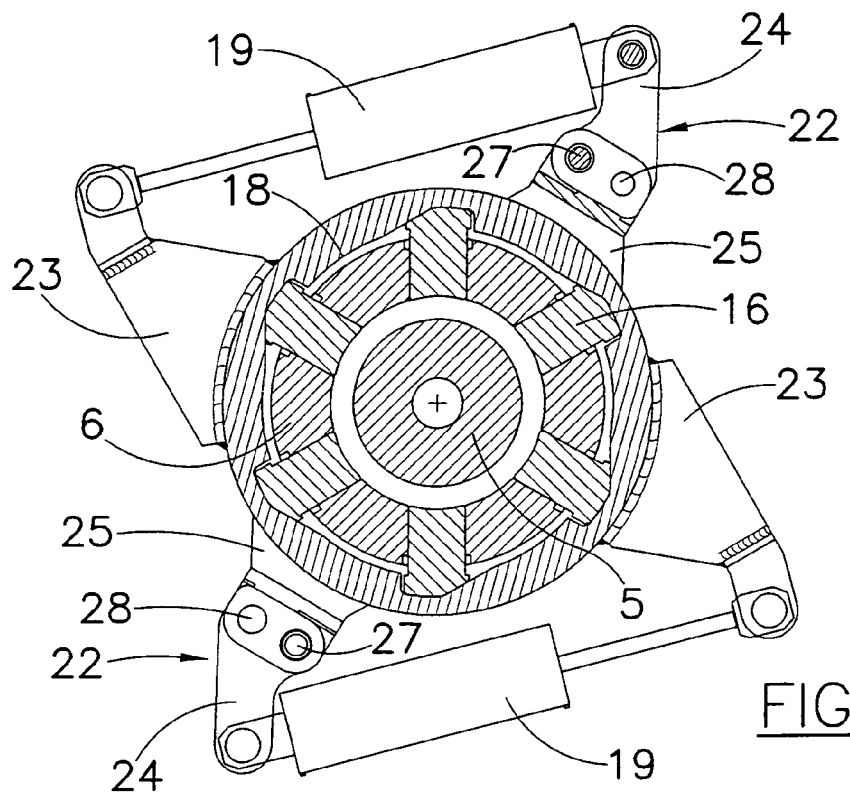
FIG. 5 shows the connector sectioned as in FIG. 1, ready for a new coupling movement.

The internal wall of the revolving ring 18 co-operates with the external end of the segments 16 in order to push out the latter ones toward the axis of the cylindrical passage 11 and into radial seats obtained as a continuous round recess 33 in the external wall of the projecting portion 5 of the fitting part 1. In the same internal wall of the revolving ring 18, on the other hand, some radial seats 34 (one for each segment 16) are obtained that, when the ring 18 is rotated as compared with the position in FIG. 2, are capable to house the segments 16 for their output from the annular recess 33 of the fitting part 1 (FIGS. 4 and 5). Chamfers 35 and 36 of the segments 16 co-operate with corresponding chamfers 37 and 38 of the seats 33 and 34 (FIG. 3) in order to determine the radial movements of the segments 16 toward the axis of the passage 11, as it will be explained hereinafter.

The mode of operation of the connector is illustrated in the drawings is easily explained.

With the revolving ring 18 in the position of FIG. 2 the segments 16 are maintained inserted into the round recess 33, therefore the two fitting parts 1 and 2 are maintained coupled to each other for the subsequent firm mutual coupling of two pipes 9 and 10. In such condition the fluid to be transferred can flow from one piping to other through the common axial passage 11. The gudgeons 28 are normally absent.

For the quick-release of the two pipes it is necessary to control the extension of one of the cylinders 19, as for instance the one shown on the bottom in the drawings. In this way, with the first part 24 of the lever 22 of the aforesaid cylinder in abutment with the shoulder 39 the same cylinder can control the counter-clockwise rotation of the lever 23 and therefore of the ring 18, while the articulation 26 of the lever 22 of the other cylinder 19 opens (FIG. 3) in order to prevent that the non-controlled cylinder hinders the rotation of the ring 18. The segments 16 can therefore be forced by the co-operating chamfers 35 and 37 to slide radially into the slots 17 in order to exit from the annular recess 33 and to insert themselves into the radial recess 34 of the projecting portion 6 of the fitting part 2 (FIG. 4). The two fitting parts 1 and 2 can thus get apart from one another with consequent separation of the piping 3 and 4.

If for any reason the controlled cylinder were not capable to extend, it would be possible to operate in the same way on the other cylinder 19, that would carry out the uncoupling movement in the same way as explained above.

Figure 6:
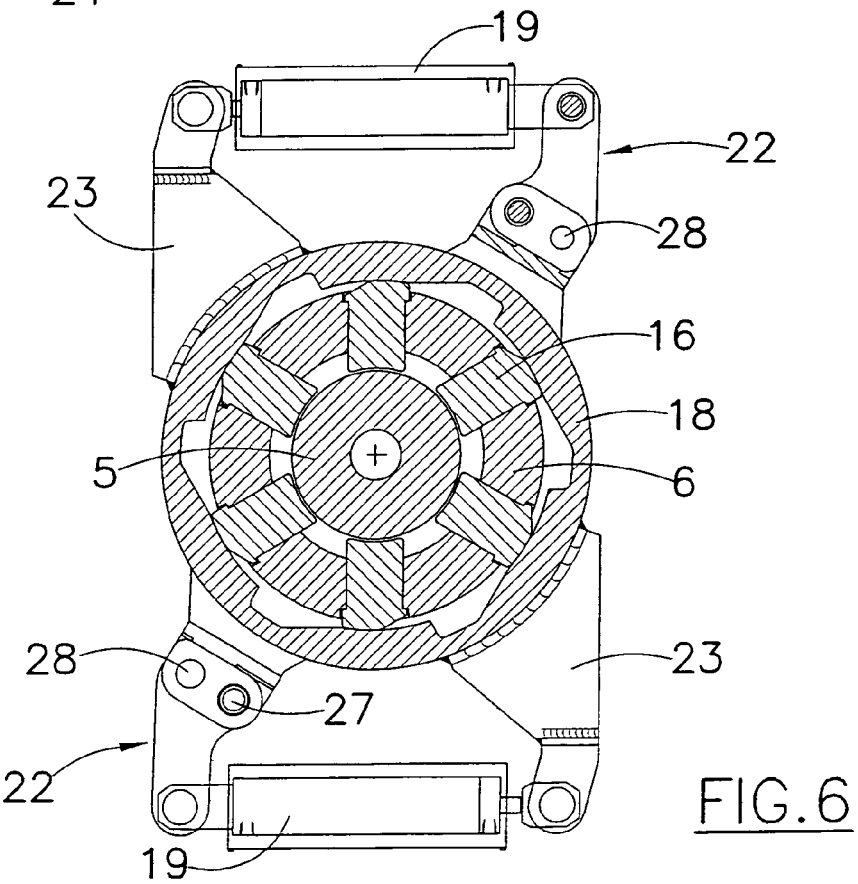
FIG. 6 shows the connector sectioned as in FIG. 1 at the end of the coupling movement.

In order to couple again, naturally after having correctly positioned the projecting portions 5 and 6 of the two fitting parts 1 and 2 one into the other one, it is necessary to extend the cylinder 19 previously non-controlled so as to determine again the closing of the previously opened articulation 26 (FIG. 5) and then to insert the gudgeons 28 into the two pairs of lined up holes 29 and 30, so as to rigidly connect to each other the two parts 24 and 25 of the levers 22. The subsequent contraction of the cylinders 19 causes the clockwise rotation of the ring 18 and therefore, owing to the aid of the chamfers 36 and 38, the radial sliding of the locking segments 16 in the respective slots 17 up to their insertion in the annular recess 33 (FIG. 6). The two fitting parts 1 and 2 are therefore coupled again to each other.

In case of damage of the hydraulic control system of the cylinders 19 it is possible to obviate to the disadvantage by connecting the mouths 31 and 32 of the same cylinders with manual pumps.

The invention claimed is:

1. A quick-coupling and quick-release connector for piping, comprising
   two tubular fitting parts fastenable to respective pipes to be coupled and quick-coupling and quick release means for said tubular fitting parts, said quick-coupling and quick release means including a plurality of locking segments circumferentially distributed in a plane perpendicular to a longitudinal axis of said tubular fitting parts and housed in a radially movable way in respective radial slots of an axial projecting portion of a first one of said tubular fitting parts that, during a coupling stage, is superimposable to a corresponding projecting axial portion of a second one of said tubular fitting parts,
   a revolving ring controllable to rotate around the axial projecting portion of the first tubular fitting part in order to work on said locking segments so as to push them into at least one radial seat of said axial projecting portion of the second tubular fitting part or to house them in their own radial seats, respectively for the coupling and the uncoupling of said tubular fitting parts, and
   a first hydraulic cylinder reacting between said first tubular fitting part and said revolving ring,
   an additional independently operable hydraulic cylinder arranged substantially at 180° from the first one in the rotation plane of the revolving ring, each one of said hydraulic cylinders being arranged so as to react between a first lever fastened to said first tubular fitting part and a second lever fastened to the revolving ring, said first lever being made up of a first part positioned radially away from the two tubular fittings and a second part positioned radially towards the two tubular parts, the first part and the second part being connected with each other by an articulation which is modifiable in order to be able to assume two different operating conditions, one operating condition for a complete mutual locking of the two parts of the first lever and the other operating condition allowing rotation of the first part of the first lever in a direction of approach to the second lever.

2. The connector according to claim 1, wherein the second part of the first lever is provided with a shoulder against which the first part of the first lever abuts in order to prevent the rotation of said first part in a direction of movement away from said second lever.

3. The connector according to claim 1, wherein said modifiable articulation is made up of a hingement pin and of a gudgeon insertable in lined up holes of the two parts of the first lever when in the coupling stage and disinsertable from them when in an uncoupling stage.

* * * * *

UNITED STATES PATENT AND TRADEMARK OFFICE
CERTIFICATE OF CORRECTION

PATENT NO.         : 7,357,426 B2
APPLICATION NO. : 10/530356
DATED              : April 15, 2008
INVENTOR(S)        : Lorenzo Bormiolo It is certified that error appears in the above-identified patent and that said Letters Patent is hereby corrected as shown below:

Title Page Item 76 correct Inventor's first name to --Lorenzo--.

Signed and Sealed this

Fifth Day of August, 2008

JON W. DUDAS
*Director of the United States Patent and Trademark Office*